Dec. 4, 1945.   J. MERCIER   2,390,445
OIL TIGHT JOINT
Filed Aug. 15, 1942

INVENTOR
JEAN MERCIER
BY
Howard J. Jeanshon
ATTORNEY

Patented Dec. 4, 1945

2,390,445

UNITED STATES PATENT OFFICE 2,390,445

OILTIGHT JOINT

Jean Mercier, New York, N. Y.

Application August 15, 1942, Serial No. 454,943

3 Claims. (Cl. 285—163)

This invention relates to fluid sealing means, and more particularly to a synthetic rubber sealing means which expands when in contact with oil.

A fluid sealing packing which depends upon pressure on the material to insure sealing has certain difficulties which may not be overcome, i. e., in the case of a cylinder cap which is threaded to a cylinder, a packing material inserted between will not necessarily be evenly compressed. The proximity of the two machine parts may be such that one or two points rather than all points are sealed by the packing material. Likewise, where two machine parts are bolted together, the packing material is unevenly spread according to the pressure caused by the bolts. The sealing means is as effective as the pressure exerted by all the bolts, which should be evenly distributed.

An object of the present invention is to provide a fluid sealing packing which expands when in contact with oil.

Another objection is to provide a sealing material which when in contact with oil will expand to give a uniform sealing effect.

A still further object is to provide a rubber compound packing which will increase in volume by at least 5% when immersed in oil. Another object of the present invention is to provide a mechanical joint having a packing material which expands when in contact with oil to provide a fluid tight joint.

A still further object of the present invention is to provide a simplified mechanical joint wherein a slight initial compression of the packing material is all that is required. Other objects and characteristic features of the invention will appear from the following detailed description of one embodiment thereof, taken in connection with the accompanying drawing wherein identical reference numerals are applied to the same parts in the several figures, and in which.

Figure 1:
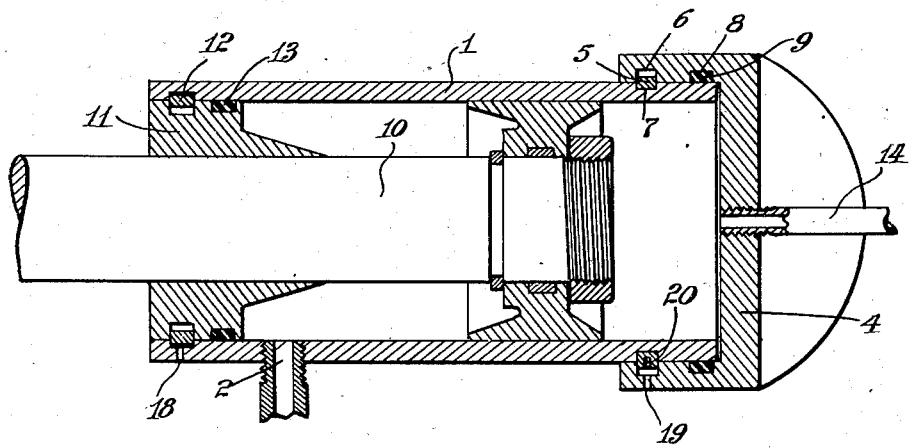
Figure 1 is a cross sectional view of a cylinder having a two way actuated piston therein in which the sealing means are provided according to the present invention.

In the embodiment of the invention herein disclosed there is provided a cylinder 1, Figure 1, which has an inlet or outlet port 2. Affixed to one end of the cylinder 1 is a cap 4 which in the preferred form is attached to the cylinder by means of a snap ring 5 which fits into an annular recess 6 in the lateral wall of cap 4 as well as an annular groove 7 in the lateral wall of the cylinder 1. Threadably secured to the cap 4 is a pipe 14 for supplying or discharging fluid as the case may be.

In mounting the cap 4 to the cylinder, as soon as the two grooves 6 and 7 are in alignment, snap ring 5 will contract and enter groove 7. Groove 6 must be deep enough to accommodate the snap ring. Groove 7 is only as deep as one-half the thickness of the snap ring 5 so that a portion of snap ring 5 will be held by groove 6 while the remaining thickness engages groove 7. In a third groove 8 in the lateral wall of the cap there is provided an annular band 9 of neoprene large enough to fill the groove completely while contacting the outer face of the wall of cylinder 1 without appreciable compression. Piston 10 is inserted into the opposite end of cylinder 1, an annular packing device 11 is also inserted after the piston by sliding over the piston rod. The packing device 11 is held in place in similar fashion by a snap ring 12 and likewise tightly sealed against the inner surfaces of the wall of cylinder 1 by a band 13 of neoprene analogous to band 9. This packing device is of the same structure patented in my U. S. Patent No. 2,157,299, issued May 9, 1939.

Cap 4 necessarily must be in a definite position, this is accomplished by placing the locking means in the desired position and then pushing it home until snap ring 5 engages in groove 7. This is one of the important advantages of the present invention. With known sealing devices, locking means are required which permit application of the parts to each other under gradually increasing pressure. Thus, for instance, a cap may be screwed on to a cylinder until the necessary pressure is reached. This requires careful designing to obtain a cap which when sufficiently threaded on will be in a predetermined radial position with respect to the cylinder.

Figure 2:
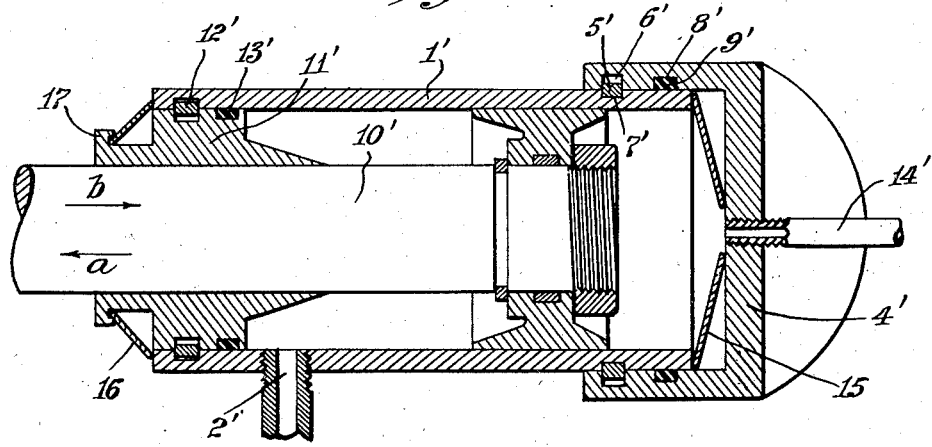
Figure 2 is a cross sectional view of another modification of the present invention.

Figure 2 shows a modification in which cylinder 1', port 2', cap 4', snap ring 5', grooves 6', 7' and 8', neoprene band 9', piston 10', packing device 11', snap ring 12', neoprene bank 13' and pipe 14' are analogous to the elements 1 to 14 of Figure 1.

In addition, the embodiment illustrated in Figure 2 is modified by suitable resilient means as for instance Belleville washers, as shown at 15 and 16 of Figure 2. These washers or other resilient means are provided for the purpose of preventing any displacement of the cap in the direction of arrow $a$ and of the packing device in the direction of arrow $b$. Normally, the forces exerted by the liquid under pressure supplied to the cylinder tend to displace cap 4 in the direction of arrow $b$ and packing device 11 in the direction of arrow $a$. Accordingly, snap ring 5 will be firmly applied to the right hand wall of groove 6'. In the same manner, snap ring 12' will be firmly applied to the left-hand wall of the groove in which it is located. There is, of course, a slight clearance between the lateral walls of the snap rings and the lateral walls of the grooves holding them. Should a force be applied to cap 4' or to packing device 11' in a direction opposite to that in which the usual forces act, a slight displacement of these elements with respect to cylinder 1' might result. This slight displacement might disturb the sealing effect of Neoprene bands 8' or 13'. To prevent any such displacement, washer 15 is provided between cap 4' and the slightly shortened wall of cylinder 1' and between the same wall and a projection 17 of packing device 11'. While the forces normally acting on cap 4' and packing device 11' may be considerable, the forces exceptionally acting in an opposite direction will be small. Consequently, the elastic resistance of the said resilient means will be sufficient to prevent any displacement of cap or packing device with respect to the cylinder.

The sealing rubber compound band (9 and 13 in Figure 1, 9' and 13' in Figure 2) may, of course, be placed in a position different from that described and shown in the drawing. As an alternative, the groove intended to receive this band, instead of being located in the wall of the cap or of the packing device, respectively, may be located in the wall of the cylinder. In certain cases, it may even be of advantage to provide a groove in either of the two parts to be joined together, i. e., as well in the cap as in the outer wall of the cylinder and in the inner wall of the cylinder as well as in the packing device. These grooves may be so disposed as to face each other when the device is assembled and may both receive a rubber compound band. As soon as the two bands come into contact with oil, they will expand towards each other and insure tightness.

Figure 3:
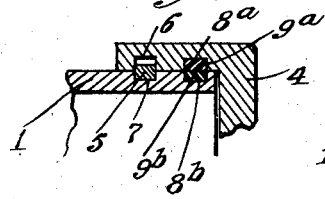
Figure 3 is a partial cross sectional view of another modification of a mechanical joint and packing means as shown in Figure 1.

Figure 3 shows groove 8 and band 9, modified in accordance with the explanations of the foregoing paragraph. Groove 8 is now located partly in cap 4, as shown at 8a, and partly in cylinder 1, as shown at 8b. Rubber compound band 9 is split in two and the portion 9a is inserted into groove 8a and the other portion, 9b, into groove 8b.

Figure 4:
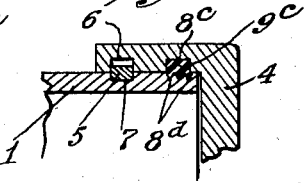
Figure 4 shows a still further modification of the mechanical joint and packing means.

A further advantageous modification is shown in Figure 4. In this figure, part of groove 8 is formed in cap 4, as shown at 8c, while a plurality of grooves 8d of smaller section is formed in the portion of cylinder 1 facing groove 8c. Only one rubber compound band 9c is employed and inserted into groove 8c. When in contact with oil, band 9c will expand and engage groove 8d. The resulting tongue and nut structure will enhance tightness and offer a certain mechanical resistance to lateral displacements.

The required dimensions for the snap ring are well known and depend upon the contemplated pressure and the nature of the materials employed. The radial dimensions must be sufficient to avoid any skidding and consequently a thickness varying between approximately ½ to a few millimeters may be sufficient. The axial dimensions depend upon the resistance of the materials employed to shearing stresses and if high grade steel be employed a width of 1 m. m. may be sufficient to withstand a pressure of several tons per square inch.

An optional modification is shown in Figure 1 at 18 and 19. If it is desired that the unit can be dismounted without cutting the cylinder, then it is advantageous to provide holes traversing said cylinder at a plurality of points on its periphery at the level of the groove which receives a snap ring. These holes will permit the insertion of tools to push the snap ring out of engagement with the wall of the cylinder. A similar hole is shown at 19 and there is a corresponding hole in snap ring 5 and the latter is provided with screw threads. A suitable tool may be introduced through hole 19 and screwed into hole 20 in snap ring 5. With the aid of these tools, snap ring 5 may be pulled out of engagement with groove 7, whereupon cap 4 may be dismounted.

I have found in practice that the various synthetic rubber compounds, as Neoprene, Buna, Perbuna and others, show very irregular expansion when in contact with oil. I have found volume variations ranging from 5% to 50%. Therefore, I prefer to test a sample of the rubber compound to be selected under the conditions under which tightness is required and with a testing device in which the volume of the rubber compound and the space in which it is located have the same measurements as the groove and the rubber band in the contemplated device. This test will show whether the rubber compound selected will expand sufficiently to produce the required sealing effect.

On the other hand, I have found that the expansion of the rubber compound will stop as soon as a sufficient sealing effect is produced, although the rubber compound in question may be capable of further expansion. Thus, for instance, I have frequently observed that, when a perfectly tight joint was slightly displaced, for instance, by an accident, creating a gap between the two metallic parts to be sealed together, a leak did occur but after a time further expansion of the sealing rubber compound closed it and resealed the two metallic parts tightly.

While I have described and illustrated practical embodiments of my invention, the latter extends to any changes or modifications within the scope of the appended claims.

What I claim is:

1. Oil-tight joint for sealing two cylindrical surfaces, which comprises two annular grooves, one in each of said surfaces and an annular rubber compound packing member inside both said grooves, said packing members being when first applied too small with respect to said grooves and subjected to insufficient pressure to insure tightness and being capable of expanding when in contact with oil.

2. Oil-tight joint according to claim 1, in which the said two grooves are opposite each other when the said two surfaces are assembled in their correct position.

3. Oil-tight joint for sealing two cylindrical surfaces, which comprises an annular groove in one of said surfaces and an annular rubber compound packing member inside said groove and a plurality of grooves of smaller section in a portion of said other surface facing the first mentioned groove when both surfaces are assembled in their correct position, said packing member being when first applied too small with respect to said grooves and subjected to insufficient pressure to insure tightness and being capable of expanding when in contact with oil.

JEAN MERCIER.